United States Patent [19]

Fuller

[11] 4,133,604
[45] Jan. 9, 1979

[54] EYEGLASS RETAINER

[76] Inventor: Robert B. Fuller, Box 153, Wilson, Wyo. 83014

[21] Appl. No.: 824,261

[22] Filed: Aug. 15, 1977

[51] Int. Cl.$^2$ .............................................. G02C 3/00
[52] U.S. Cl. ..................................... 351/123; 351/156
[58] Field of Search .............. 351/122, 123, 156, 157, 351/43

[56] References Cited

U.S. PATENT DOCUMENTS

| 1,819,738 | 8/1931 | Daniels | 351/157 X |
| 2,481,946 | 9/1919 | Pendleton | 351/157 |
| 2,539,922 | 1/1951 | Nyberg | 351/157 |
| 2,704,961 | 3/1955 | Weil | 351/157 |
| 3,450,467 | 6/1969 | Phillips | 351/157 |
| 3,502,396 | 3/1970 | Greenberg | 351/157 |
| 3,874,776 | 4/1975 | Seron | 351/123 |
| 3,879,804 | 4/1975 | Lawrence | 351/157 X |

Primary Examiner—Paul A. Sacher
Attorney, Agent, or Firm—Posnack, Roberts, Cohen & Spiecens

[57] ABSTRACT

A head band for retaining eyeglasses in place comprising a elastomeric, fabric covered stretch band made adjustable by sliding the bows or temple pieces of eyeglasses into tubular members formed from the end portions of a flat band. The tubular members are an integral part of the band so the assembly is a unitary piece.

4 Claims, 4 Drawing Figures

EYEGLASS RETAINER

BACKGROUND OF THE INVENTION

1. Field of the Invention

The present invention relates to retainers for eye-glasses comprising head bands that fit around the rear of the head and attach to the temples or bows of the glasses.

2. Prior Art

In the prior art, various retainers for eye-glasses have been advanced which hold spectacles through the use of a band around the head. These devices have worked well in many instances, but attractive, low cost, and efficient head bands which will comfortably hold the eye-glasses in position for use are still desired.

U.S. Pat. No. 2,481,946 illustrates a neck retainer for spectacles which has a small tubular member attached to a fabric strap which fits around the neck, and holds the glasses in position when the eye-glasses are actually off. In other words, the strap is to hold the glasses in place around a person's neck, rather than retain the glasses in position during use.

A similar device is shown in U.S. Pat. No. 2,704,961 where a neck strap is utilized for retaining the eye-glasses in position when the glasses are removed from the face and are supported around the neck.

A device for retaining eye-glasses or spectacles on the head comprising members that are designed to replace the normal eye supported bow pieces is shown in U.S. Pat. No. 1,819,738. In this patent, short temple pieces are utilized and an elongated band (bow) that fits around the back of the head is made of a resilient material and is fastened to the temples through tubular connectors. Suitable adjustment devices may be utilized with the spectacle support, and thus used to hold the glasses in position on the face during use.

U.S. Pat. No. 3,450,467 illustrates a spectacle retainer that grips the spectacles, and attaches to the temple pieces or bows of the spectacles to hold the spectacles in position. A type of neck strap for supporting eye-glasses when removed is shown in U.S. Pat. No. 3,879,804 which illustrates a band that clips onto spectacles or goggles and will grip these spectacles or goggles through a tightening loop connection. A similar type device is shown in U.S. Pat. No. 3,874,776.

U.S. Pat. No. 3,502,396 illustrates a nonstretch adjustable eye-glass holder that fits behind the head during use and has a series of holes for a fastener that provide for adjustment of the length of the strap after the strap has been attached to the bows or temple pieces of the eye-glasses.

SUMMARY OF THE INVENTION

The present invention relates to an eye-glass retainer for holding eye-glasses in position on the head during use. The device comprises an elastic or resilient material such as a foam that is made from a band having formed tubular members at opposite ends thereof a suitable distance apart. The tubular members are made of size so that they will slip over the temples (or bow pieces) of eye-glasses and be frictionally retained. Adjustment of the force of holding of the eye-glasses is made by sliding the tubular members along the temples to a desired position.

In the preferred form of the invention the band will be made of a closed cell neoprene foam material covered with a woven cloth material that adheres to the neoprene and is held in place across the entire surface on the neoprene surface. The material may be foam backed Nylon Tricot. The fabric material is placed on the interior of the tubular members formed for sliding over the temples or bow pieces of the eye-glasses and when the tubular members are stretched, for example, as when the band that goes around the head is placed under tension, the woven material will tend to tighten down onto the temples or bow pieces of the glasses through an action similar to that which occurs with a "chinese finger trap" wherein a tension placed on a tube of woven material will tighten it down or tend to make it of smaller diameter, while compression will tend to extend it.

Both sides of the retainer band can be covered with material if desired. It is important that the interior of the foam (rubber) tubular member be covered with cloth to permit the tube to be slid over the temple pieces and to be adjusted with some ease.

The band is placed around the head behind the ears, thereby holding the glasses in position under a slight tension. The device is not primarily designed as a neck strap for supporting the eye-glasses when removed from the eyes, although it may be used as such if desired. Additionally, the band may be made so that it can provide floatation for people using glasses during sporting events or water activities. This can be done merely by adding additional layers of neoprene foam to an existing band, or making the band sufficiently wide and thick (as shown herein) to provide adequate floatation for the glasses with which they are used.

When the band is in position it can be adjusted to exert a tension directly back rearwardly on the eye-glasses themselves without exerting any downward pressure on the glasses and thus it holds the glasses comfortably and securely. The eye-glasses also can be pushed up to the forehead and held in position with the band remaining around the wearers head behind the ears. The device is intended for use at any time desired, but generally, the user will be engaged in physical activities, such as sports or outdoor activities when the retainer is used.

DESCRIPTION OF THE PREFERRED EMBODIMENT

Figure 1:
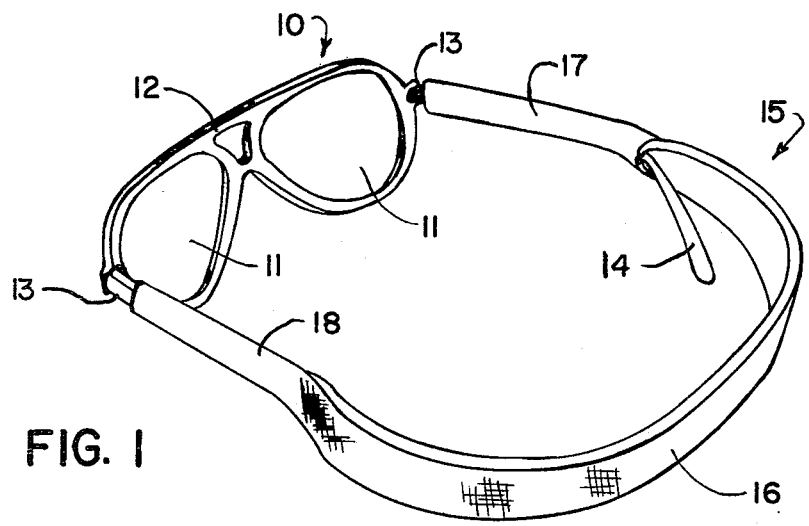
FIG. 1 is a perspective view illustrating eye-glasses having a retainer made according to the present invention installed thereon.

Referring to FIG. 1, a pair of eye-glasses illustrated generally at 10 as shown has lenses 11,11, a main frame 12 for the lenses, and temples or bow pieces indicated generally at 13,13 hingedly attached to the main frame of the eye-glasses in the normal manner. Bow pieces 13 have ear retainers 14, as shown on one side of FIG. 1 (the other ear piece is hidden in the perspective view), and a retainer strap made according to the present invention illustrated at 15 is slipped onto the bows of the eye-glasses.

The retainer strap comprises a flat strap member 16, a first tubular member 17, and a second tubular member 18 at the opposite ends of the strap. The first and second tubular members 17 and 18 are formed by folding or rolling the strap into a tubular foam and then affixing the edges of the flat band together along the junction line 17A (for member 17) as shown generally in FIG. 2. The edges can be fused or glued together or the band can be molded initially with tubular members at its ends. The tubular members are open at both ends so they slip onto the straight portions of the bows and the ear pieces extend out as shown.

Figure 2:
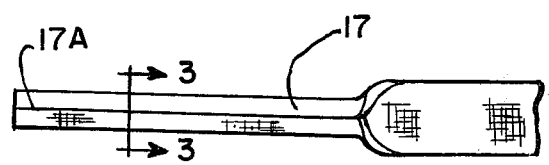
FIG. 2 is an enlarged fragmentary side view of a retainer band end portion which fits over the bows of eye-glasses as shown in FIG. 1.
Figure 3:
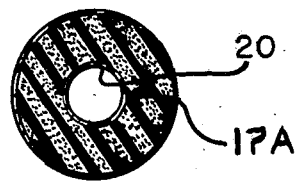
FIG. 3 is a sectional view taken generally as on line 3—3 in FIG. 2 but with the eye-glass bow removed.

The strap itself is made of a piece of resilient or elastic material such as closed cell neoprene foam, in the preferred foam, or some other suitable resilient material covered with a fabric layer such as Nylon Tricot on at least the interior side shown in FIG. 2. When the tubular members 17 and 18 are formed the interior of the formed tubes will be lined with a fabric material as generally indicated at 20 in FIG. 3.

The closed cell foam can be of any desired thickness, and as known, closed cell foam floats so that if eyeglasses are dropped in water when they have a retainer of the present invention installed on them the retainer will tend to support the eye-glasses in the water.

The retainer is utilized by slipping the tubular end portions 17 and 18 over the eye-glass temples, and adjusting the tubular portion so that the flat band portion 16 is under sufficient tension around the back of a user's head to hold the eye-glasses under light tension rearwardly on the nose and adjacent the eyes during use.

It should be noted that in adjustment, the tubular members 17 and 18 may be slid along the temples or bow pieces because of the fabric layer, and as tension is exerted from flat portion 16, which tends to pull on the tubular members, the fabric covering the bow pieces, and against which the neoprene foam is mounted, will tend to elongate and tighten down onto the bow pieces much in the manner of the so-called woven chinese finger traps. However, adjustment can easily be effected by placing the tubular members 17 and 18 under compression or pushing them off or on as desired. However, tension does tend to be resisted by tightening the fabric portions down onto the bow pieces and by friction. Note in FIG. 1 that tubular member 17 is slid all the way to the hinge of the bow piece while tube 18 is retracted slightly.

It can be seen that in automatically forming the tubular members 17 and 18 they can be formed quickly, and could even be molded into position on the ends of the band.

The glasses can be worn comfortably and securely on the forehead when not in use by merely permitting the band 16 to stretch as the glasses are raised. The ear pieces of the glasses go through the tubular members 17 and 18 as shown in FIG. 1, so that they protrude out and fit over the ears of the user.

By sliding the tubular membes 17 and 18 along the side bow pieces, the foam material provides a cushion between the head and the bow pieces for greater comfort as well. The tension from the band 16 is directly rearward on the temples or bow pieces and there is no downward pressure exerted on the ears. This makes the device very comfortable to use.

No mechanical fasteners are necessary, as shown, and the quick, easy installation of the tubular members formed from a unitary band of elastic, foam type material provides for easy adjustment, low cost and attractive usage.

Figure 4:
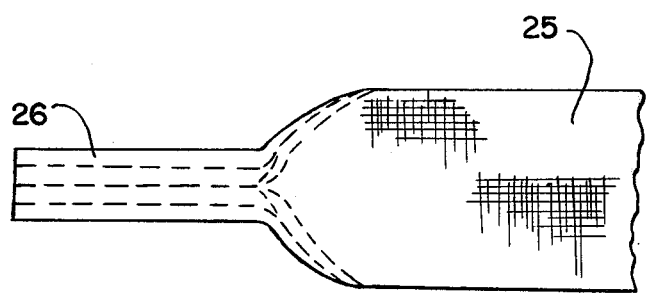
FIG. 4 is a part schematic plan view of an enlarged band utilized for floatation purposes prior to being formed into a retainer made according to the present invention.

Referring to FIG. 4, the flat layout of a band that has a wider body portion indicated generally at 25 is illustrated. The body portion 25 is wider than the band shown in FIG. 2, and the flat layout for the tubular pieces indicated at 26 would be the same width as the band whon in FIG. 2. The tubular pieces can be formed from this portion 26 merely by rolling them and forming them along the junction line of the two edges as shown in dotted lines. The center dotted line in FIG. 4 represents the junction line and the outer dotted line represents the edges of the tubular member that is formed.

The wider piece 25 provides for greater floatation when closed cell foam is used so that it is insured that the glasses will float when dropped into water and when attached to the retainer.

The device is easily installed, low cost, easily adjusted and easily carried when not in use. Because it is made in one piece there are no pieces to be lost such as separate mechanical fasteners.

What is claimed is:

1. An eye-glass retainer comprising a band of material, means at opposite ends of said band forming tubular members secured to said band and open at both ends, said band and tubular members being from a unitary piece of material, said means forming the tubular members comprising end portions of the band rolled into open ended tubes and held in tubular shape, said material comprising an elastic material having a fabric backing on at least one side thereof and lining the interior of said tubular members, the tubular members being of size to slip over and grip the temples of eye-glasses to be retained, and said band being of length to exert a resilient rearward force on the eye-glasses when in place around the head of a wearer of such eye-glasses on which the tubular members are placed, said elastic material constituting means for resiliently transmitting tension said from the band to the tubular members and said fabric backing constituting means for transmitting the resilient force to sid temples and which fabric will tend to elongate and tighten onto the temples of the eye-glasses under the action of said force.

2. The combination of claim 1 wherein said band is made of elastomeric foam material.

3. The combination of claim 1 wherein said band is made of an elastomeric foam material and is of sufficient size to provide floatation for a pair of eye-glasses on which the band is used.

4. The combination of claim 2 wherein said fabric is a woven Nylon Tricot material.

* * * * *